US012566966B2

(12) United States Patent
Gajewski et al.

(10) Patent No.: US 12,566,966 B2
(45) Date of Patent: Mar. 3, 2026

(54) TRAINING ADAPTABLE NEURAL NETWORKS BASED ON EVOLVABILITY SEARCH

(71) Applicant: Uber Technologies, Inc., San Francisco, CA (US)

(72) Inventors: Alexander P. Gajewski, New York, NY (US); Jeffrey Michael Clune, San Francisco, CA (US); Kenneth Owen Stanley, San Francisco, CA (US); Joel Anthony Lehman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 1165 days.

(21) Appl. No.: 16/678,038

(22) Filed: Nov. 8, 2019

(65) Prior Publication Data

US 2020/0151576 A1     May 14, 2020

Related U.S. Application Data

(60) Provisional application No. 62/757,682, filed on Nov. 8, 2018.

(51) Int. Cl.
G06N 3/086     (2023.01)
G06N 3/045     (2023.01)
G06N 3/08     (2023.01)

(52) U.S. Cl.
CPC ............. G06N 3/086 (2013.01); G06N 3/045 (2023.01); G06N 3/08 (2013.01)

(58) Field of Classification Search
CPC ........... G06N 3/086; G06N 3/045; G06N 3/08
See application file for complete search history.

(56) References Cited

U.S. PATENT DOCUMENTS

| | | | |
|---|---|---|---|
| 6,173,076 B1 * | 1/2001 | Shinoda | G10L 15/144 704/251 |
| 6,983,227 B1 * | 1/2006 | Thalhammer-Reyero | G16B 50/20 703/2 |
| 10,152,676 B1 * | 12/2018 | Strom | G06N 3/084 |

(Continued)

FOREIGN PATENT DOCUMENTS

WO     WO-2015184729 A1 * 12/2015 ............. G06N 20/00

OTHER PUBLICATIONS

Salimans—weight-normalization-a-simple-reparameterization-to-accelerate-training-of-deep-neural-networks-Pape (Year: 2016).*

(Continued)

*Primary Examiner* — Omar F Fernandez Rivas
*Assistant Examiner* — Shamcy Alghazzy
(74) *Attorney, Agent, or Firm* — Fenwick & West LLP

(57)     ABSTRACT

Systems and methods are disclosed herein for training neural networks that can be adapted to new inputs, new tasks, new environment, etc. by re-training them efficiently. A parameter vector is initialized for a neural network. Perturbed parameter vectors are determined using the parameter vector. Behavior characteristics are determined for each perturbed parameter vector. The parameter vector is modified by moving it in the parameter vector space in a direction that maximizes a diversity metric. Other neural networks can be trained for new tasks or new environments using the parameter vector of the neural network.

18 Claims, 5 Drawing Sheets

(56)  References Cited

U.S. PATENT DOCUMENTS

| | | | |
|---|---|---|---|
| 10,976,429 B1 * | 4/2021 | Jiang | G06N 3/063 |
| 11,250,328 B2 * | 2/2022 | Liang | G06N 3/045 |
| 2012/0170834 A1 * | 7/2012 | Wang | G06F 18/2193 |
| | | | 382/159 |
| 2014/0114727 A1 * | 4/2014 | Shan | G06Q 10/06375 |
| | | | 705/7.37 |
| 2014/0297235 A1 * | 10/2014 | Arora | G06N 7/01 |
| | | | 703/2 |
| 2015/0379429 A1 * | 12/2015 | Lee | G09B 5/00 |
| | | | 706/11 |
| 2017/0132769 A1 * | 5/2017 | Barron | G06F 18/22 |
| 2017/0278246 A1 * | 9/2017 | Kim | G06T 7/11 |
| 2018/0068218 A1 * | 3/2018 | Yoo | G06V 10/764 |
| 2018/0302498 A1 * | 10/2018 | Xie | G06N 20/00 |
| 2019/0012608 A1 * | 1/2019 | Teixeira | G06N 7/01 |
| 2019/0042943 A1 * | 2/2019 | Dasgupta | G06N 3/084 |
| 2019/0043168 A1 * | 2/2019 | Rampal | G06F 18/2193 |
| 2019/0050727 A1 * | 2/2019 | Anderson | G06N 3/08 |
| 2019/0213470 A1 * | 7/2019 | Schmidt | G06N 3/084 |
| 2019/0251437 A1 * | 8/2019 | Finn | G06N 3/045 |
| 2020/0065664 A1 * | 2/2020 | Saha | G06F 21/577 |
| 2020/0143231 A1 * | 5/2020 | Fusi | G06N 3/045 |
| 2021/0365672 A1 * | 11/2021 | Hu | G06V 40/193 |

OTHER PUBLICATIONS

Wu—Googles Neural Machine Translation System Bridging the Gap between Human and Machine Translation (Year: 2016).*
Oong—Adaptive Evolutionary Artificial Neural Networks for Pattern Classification (Year: 2011).*
Leiva—Methods For Generating Perturbation Vectors For Topography Optimization of Structures (Year: 2003).*
Diversity in Neural Network Ensembles (Year: 2004).*
Diverse Neural Network Learns True Target Functions (Year: 2017).*
Gradient Estimation Using Stochastic Computation Graphs (Year: 2015).*

* cited by examiner

100

300

TRAINING ADAPTABLE NEURAL NETWORKS BASED ON EVOLVABILITY SEARCH

CROSS-REFERENCE TO RELATED APPLICATIONS

The instant application claims the benefit of U.S. Provisional Patent Application No. 62/757,682, filed Nov. 8, 2018, the disclosure of which is hereby incorporated by reference herein in its entirety.

BACKGROUND

1. Technical Field

The subject matter described generally relates to artificial neural networks, and in particular to training adaptable artificial neural networks using evolvability search.

2. Background Information

Artificial intelligence is used for performing complex tasks, for example, natural language processing, computer vision, speech recognition, bioinformatics, recognizing patterns in images, and so on. Artificial intelligence techniques used for these tasks include machine learning based models, for example, neural networks. One such application of artificial intelligence is in systems that monitor their environment and take appropriate actions to achieve a task, for example, a robot monitoring its surroundings using a camera and navigating through an obstacle course or an autonomous vehicle monitoring the road traffic using various sensors including cameras and LIDAR (light detection and ranging) sensors and driving through traffic on a road.

Conventional techniques for training such machine learning based models use a specific type of training data set or train the model in a particular environment. If these machine learning based models are used in a different environment or used for performing a slightly different task, the models have to be trained from scratch even if the new environment is slightly different from the previous environment used for training the model. For example, an autonomous vehicle using neural networks trained using data set of medium size cities may not be able to drive in large cities such as San Francisco. Such neural networks may have to be re-trained from scratch using data from large sized cities to be able to successfully drive in such cities. Accordingly, conventional machine learning based models are not able to adapt to changes in their input, environment, or changes in the task performed using the model.

SUMMARY

Systems and methods are disclosed herein for training neural networks that can be adapted to new inputs, new tasks, new environment, etc. by re-training them efficiently. The amount of training required for retraining the model is significantly less than the amount of training required for training a similar model from scratch, for example, if the model was initialized to a randomly generated parameter vector.

A parameter vector is initialized for a neural network. The following steps are repeatedly performed. Perturbed parameter vectors are determined within a neighborhood of the parameter vector by perturbing the parameter vector in a parameter vector space. Values of a behavior characteristic are determined for each perturbed parameter vector. A derivative of a diversity metric is determined based on an aggregate of the values of the behavior characteristic. The aggregate is determined over the plurality of perturbed parameter vectors. The parameter vector is modified by moving it in a direction in the parameter vector space that is determined based on the derivative of the diversity metric that maximizes the diversity metric. Other neural networks may be trained for new tasks or for new environments using the parameter vector of the neural network.

In an embodiment, training the second neural network is performed by performing the following step. The system receives a new task. The system initializes the second neural network to the parameter vector of the first neural network. The system trains the second neural network to perform the new task. The trained second neural network performs the new task.

The technique can be applied to neural networks that need to be trained in different environments. For example, neural networks used in autonomous vehicles that need to be trained in different traffic conditions, different weather conditions, or different types of cities can use the above method for retraining of the neural networks.

Figure 1:
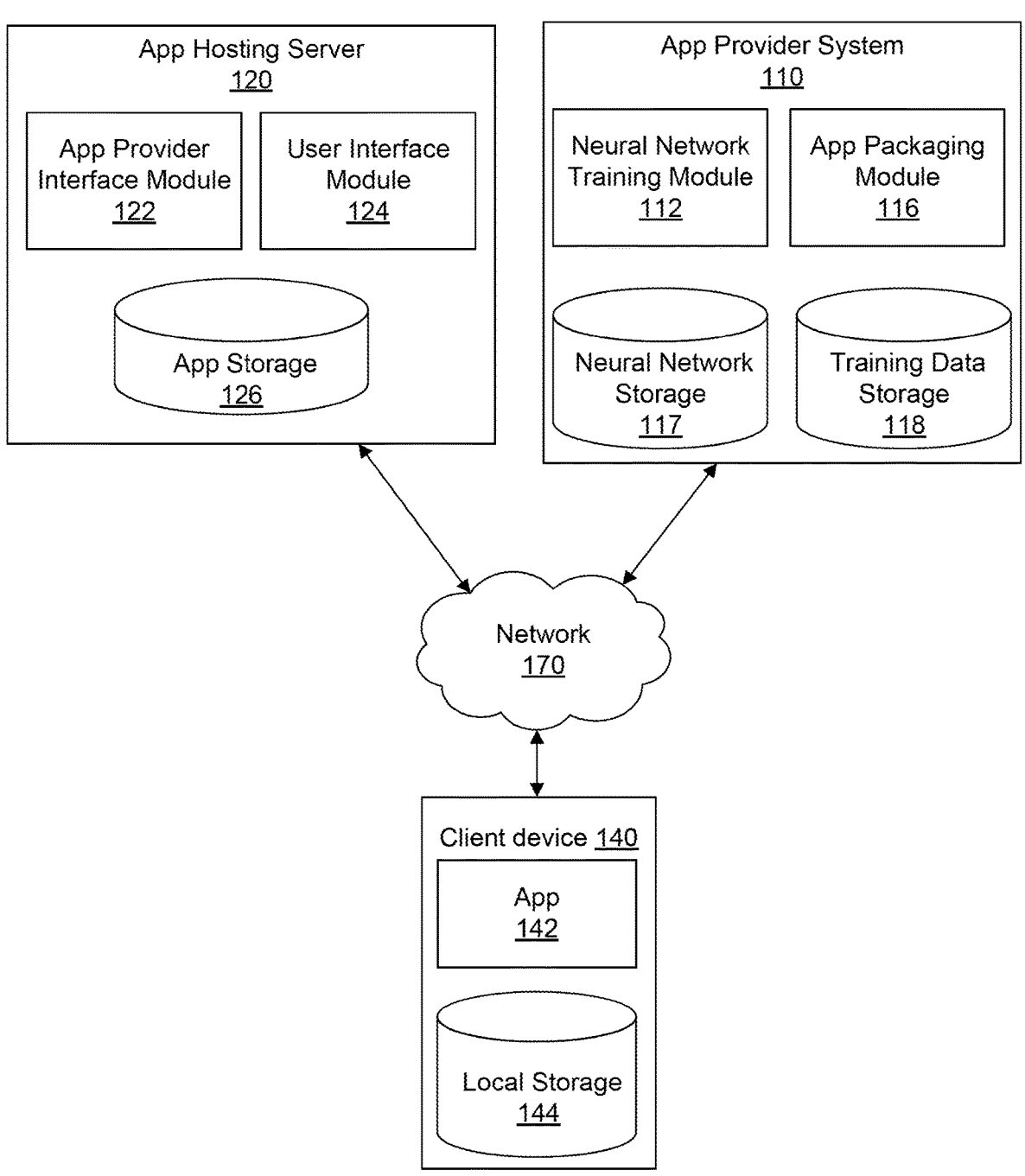
FIG. 1 is a high-level block diagram illustrating a networked computing environment in which neural networks may be used, according to one embodiment.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Embodiments of the invention generate machine learning based models that are adaptable. Accordingly, these models can be adapted to new inputs, new tasks, new environment, etc. by re-training them. However, the amount training required by the embodiments is significantly less than the amount of training required from scratch, for example, by initializing a model to randomly generated parameter vector.

Accordingly, embodiments of the invention perform searches for parameter vectors whose perturbations lead to diverse behaviors, and which therefore may be quickly adapted to new tasks after training. The technique is referred to as evolvability ES (evolutionary search). A set of parameters is trained such that a few additional stochastic gradient descent training steps adapt it to a new task. Evolvability ES is easily parallelizable and can run quickly given sufficient compute resources.

Embodiments of the invention maximize a statistic of behavioral diversity of a parameter vector's perturbations. The system represents behavior as a behavior characteristic, a vector-valued function mapping parameter vectors z to behaviors B(z). For example, in a locomotion task, a policy's behavior might be represented as its final position on a plane. Embodiments use two diversity statistics which lead to maximum variance (MaxVar) and maximum entropy (MaxEnt) variants of Evolvability ES.

In one embodiment, the system uses a diversity statistic MaxVar that leads to maximum variance. Evolvability ES maximizes the total variation of the BC over the population, which can be formulated as the loss function specified in equation (1), $$J(\theta) = \sum_j \mathbb{E}_z[(B_j(z) - \mu_j)^2] \qquad (1)$$

where the expectation is over policies $z \sim \pi(\cdot; \theta)$, the summation is over components j of the BC, and $\mu_j$ represents the mean of the $j^{th}$ component of the BC. A policy z specifies a distribution over actions to take conditioned on the state an agent finds itself within.

In another embodiment, the system uses a diversity metric MaxEnt that maximizes entropy rather than variance. To estimate entropy, the system first computes a kernel-density estimate of the distribution of behavior for some kernel function $\varphi$ based on equation (2).

$$p(B(z); \theta) \approx \mathbb{E}_{z'}[\varphi(B(z') - z)] \qquad (2)$$

The system uses a loss function based on kernel function which estimates the entropy as specified by equation (3).

$$J(\theta) = \mathbb{E}_z[\log \mathbb{E}_{z'}[\varphi(B(z') - z]] \qquad (3)$$

Embodiments estimate both the loss and their gradients from samples based on a differentiation of these loss functions.

Example Systems

FIG. 1 is a high-level block diagram illustrating a networked computing environment in which neural networks may be used, according to one embodiment. In the embodiment shown in FIG. 1, the networked computing environment 100 includes an application provider system 110, an application provider server 120, and a client device 140, all connected via a network 170. An application is also referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software (e.g., an application designed to run on a cell phone or tablet) develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a neural network training module 112, an application packaging module 116, neural network storage 117, and training data storage 118. In other embodiments, the application provider system 110 contains different and/or additional elements. In addition, the functions may be distributed among the elements in a different manner than described.

The neural network training module 112 is used to train full neural networks. In one embodiment, the neural network training module 112 takes a set of training inputs that have known outputs (e.g., stored in the training data storage 118) and divides it into a training set and a validation set. The neural network is then trained using the training set (e.g., using a backpropagation algorithm) and then tested against the validation set to determine its accuracy after training. This process can be repeated using variations in the structure of the neural network and the results of validation compared to identify a neural network that is likely to reliably make the intended determination when presented with input data for which the correct output is already known.

For example, a neural network might be intended to identify faces in photographs. The training and validation sets would contain a variety of faces and instances of images including no face at all. The network is trained by adjusting parameters (e.g., node weightings) to minimize a loss function (i.e., a measure of the number and/or degree of errors) that results from applying the network to the training set. Once the neural network has been trained, it is applied to the validation set and the degree to which it successfully identifies faces is recorded. If the network makes few or no errors when applied to the validation set, this is a strong indicator that the network will correctly identify faces in photographs that have not already been classified.

The app packaging module 116 takes a lower-order representation of a neural network and packages it into an app to be provided to client devices 140. For example, the app packaging module 116 might be used to create an app for booking and managing trips with a ride-sharing service. In one embodiment, the app might include a neural network configured to take various data available at the client device 140 and predict whether the device is currently inside a vehicle providing a ride. The full neural network may be too large to provide to client devices 140 over the network 170, so the app instead includes a lower-order representation that is sufficiently accurate to provide a good user experience. Once packaged, the app is made available to client devices 140 (e.g., via the app hosting server 120).

The neural network storage 117 and training data storage 118 include one or more computer-readable storage-media that are configured to store neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 122 provides an interface with which app providers (e.g., the operator of app provider system 110) can add apps to a marketplace or other on-line store to make them available to users (either free or for payment of value). In one embodiment, an app provider fills out an on-line form with basic information about the app (e.g., name, app provider name, version number, a short description of what it does, and the like) and uploads the app in an appropriate format. The app provider interface module 122 adds the app (along with metadata with some or all of the information provided about the app) to app storage 126. In some cases, the app provider interface module 122 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface using which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In the embodiment shown in FIG. 1, the client device 140 includes an application 142 and local storage 144. The application 142 is one that uses a neural network to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

System Architecture

Figure 2:
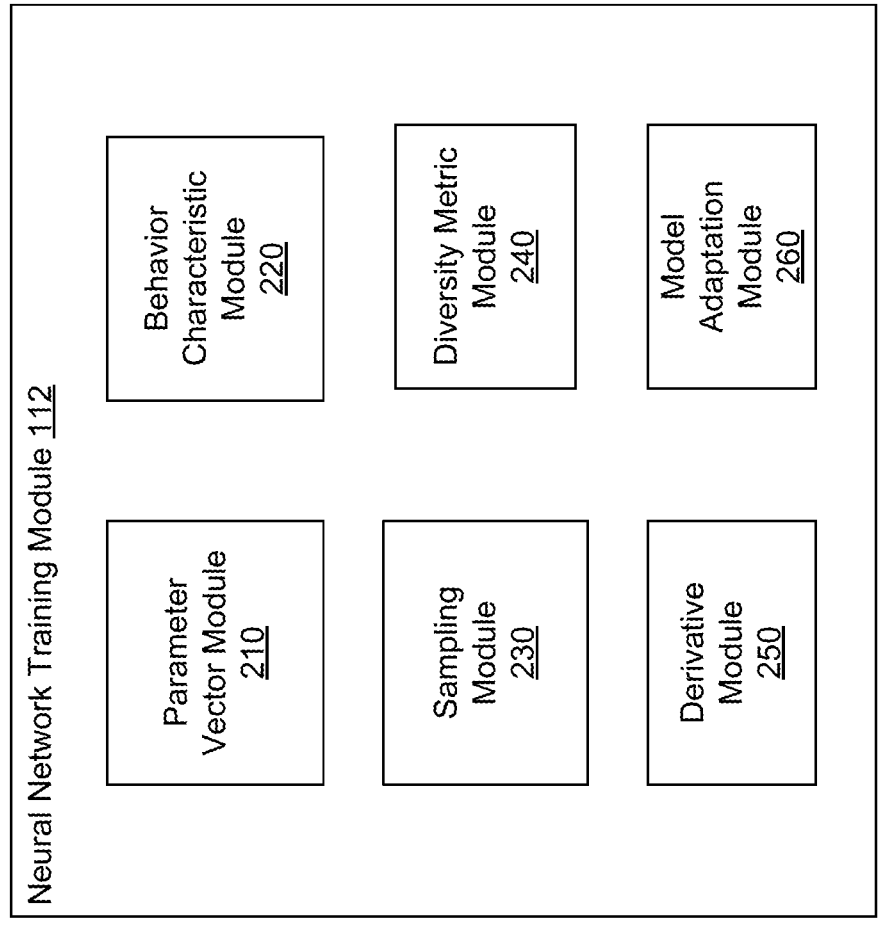
FIG. 2 illustrates a system architecture of a neural network training module, according to one embodiment.

FIG. 2 illustrates a system architecture of a neural network training module, according to one embodiment. The neural network training module 112 comprises parameter vector initialization module 210, a behavior characteristic module 220, a sampling module 230, a diversity metric module 240, a derivative module 250, and a model adaptation module 260. Other embodiments may include more of fewer modules than those indicated herein. Functions performed by a particular module may be performed by other modules than those indicated herein.

The parameter vector initialization module 210 initializes the parameter vector for training a model. In an embodiment, the parameter vector initialization module 210 initializes the parameter vector using random number generation. Accordingly, the parameter vector initialization module 210 uses a seed and generates random numbers from the seed to initialize each element of the parameter vector.

The behavior characteristic module 220 evaluates behavior of task based on a neural network corresponding to a parameter vector. In an embodiment, the behavior characteristic module 220 represents the behavior characteristic as a vector-valued function mapping parameter vectors z to behaviors B(z). For example, in a locomotion task, a policy's behavior is represented as its final position on a plane.

For a 2-D locomotion task, a neural network policy controls a robot. The policy receives as input the robot's position and velocity, and the angle and angular velocity of its joints. The policy outputs as actions the torques to apply to each of the robot's joints. In this domain, the behavior characteristic module 220 represents the behavior characteristic as the final x coordinate of the robot.

For a 3-D locomotion task, a policy controls a robot, receiving as inputs the robot's position and velocity and the angle and angular velocity of its joints. The policy outputs torques for each of the joints of the robot. In this domain, the behavior characteristic module 220 represents the behavior characteristic as the final x, y position.

The sampling module 230 determines a plurality of parameter vectors within a threshold neighborhood of a given parameter vector. The sampling module 230 determines each of the plurality of parameter vectors by perturbing the given parameter vector. The sampling module 230 may perturb the given parameter using a randomly generated value. For example, the sampling module 230 generates a random value that may be positive or negative and either adds the random value to an element of the parameter vector or multiples the random value with the element of the parameter vector. In an embodiment, the sampling module 230 obtains a perturbed parameter vector by sampling from a probability distribution that has the given parameter vector as the mean.

The diversity metric module 240 comprises instructions for determining a loss function for a given parameter vector. The loss function represents a diversity metric based on an aggregate of values of behavior characteristics corresponding to a plurality of parameter vectors. The diversity metric computation may correspond to the expression specified in equation (1), equation (3), or another expression. The plurality of parameter vectors are obtained by perturbing the given parameter vector.

The derivative module 250 determines a derivative of the loss function for a given plurality of behavior characteristics corresponding to each of a plurality of parameter vectors. In an embodiment, the derivative module 250 comprises an automatic differentiation tool, for example, PYTORCH. The derivative module 250 receives as input, a computation graph of a function that represents a loss function of the neural network, for example, functions based on equation (1) or equation (3). The derivative module 250 receives both the structure of the computation graph representing the aggregate metric, as well as the values of the computation graph's leaves. The computation graph's leave represent the evaluated behaviors of each of the perturbed parameter vectors, as well as the perturbed parameter vectors themselves. The derivative module 250 returns the value of the gradient of the metric with respect to the parameters of the distribution of the perturbed parameter vectors. In an embodiment, the derivative module 250 determines derivatives using a technique called backpropagation that uses the chain rule of differentiation. In this embodiment, the derivative module 250 propagates values backwards through the computation graph, starting at its output node and ending at the leaves with respect to which the gradient is desired.

The model adaptation module 260 receives a first trained neural network represented using a parameter vector and further trains it to obtain a second neural network for performing a new task. Accordingly, the model adaptation module 260 adapts a neural network N to obtain a neural network N' for performing the new task. The process of adapting a neural network to perform a new task is further illustrated in the flowchart of FIG. 3.

Overall Process

Figure 3:
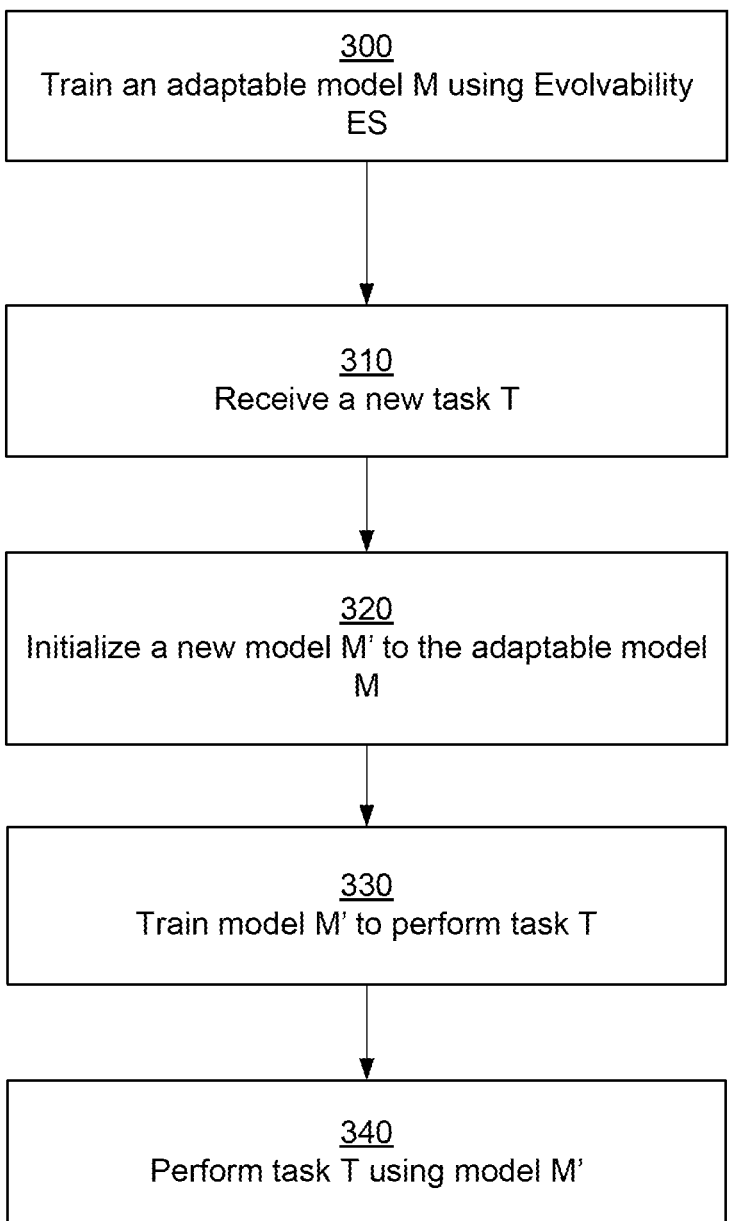
FIG. 3 is a flowchart illustrating the process of adapting a neural network for a new task, according to one embodiment.

FIG. 3 is a flowchart illustrating the process of adapting a neural network for a new task, according to one embodiment. The steps described herein may be processed in an order different from that shown in the flowchart. Furthermore, the steps may be performed by modules other than those indicated herein.

The neural network training module 112 trains 300 an adaptable model M using the techniques disclosed herein, referred to as Evolvability ES. Details of the process used to train 300 the adaptable model are further described in the flowchart illustrated in FIG. 4. The system performing the training 300 of the model stores the model in a computer readable storage system.

The system performing the training 300 of the model may transmit the adaptable model M to a target system such that the neural network training module 112 of the target system executes the remaining steps 310, 320, 330, and 340. Alternatively, the neural network training module 112 of the system performing the training 300 of the model may execute the remaining steps 310, 320, 330, and 340.

The neural network training module 112 receives 310 a new task T, for example, a task for which the adaptable model M was not previously trained. The neural network training module 112 initializes a new model M' to the parameter vectors of the adaptable model M. The neural network training module 112 trains 330 the model M' to perform the new task T.

The neural network training module 112 may perform the training 330 using supervised learning in which the neural network training module 112 receives a labelled training data set based on the task T. The neural network training module 112 may train 330 the model M' using reinforcement learning. The system performing the training 330 may store the trained model M' in a computer readable storage medium. The system performing the training 330 may perform the task T using the trained model M'. Alternatively the system performing the training 330 may transmit the parameter vectors of the model M' to another system that uses a neural network based on the parameter vectors to perform the task T.

The training 330 required to obtain the trained model M' starting from the parameter vector of the adaptable model M is significantly less than the training required for generating the model M' from a randomly generated parameter vector. As a result, the use of the adaptable model M as an initial parameter vector for training the model for new tasks improves the efficiency of execution of the training process and generates better performing models M' for a given amount of resources.

Figure 4:
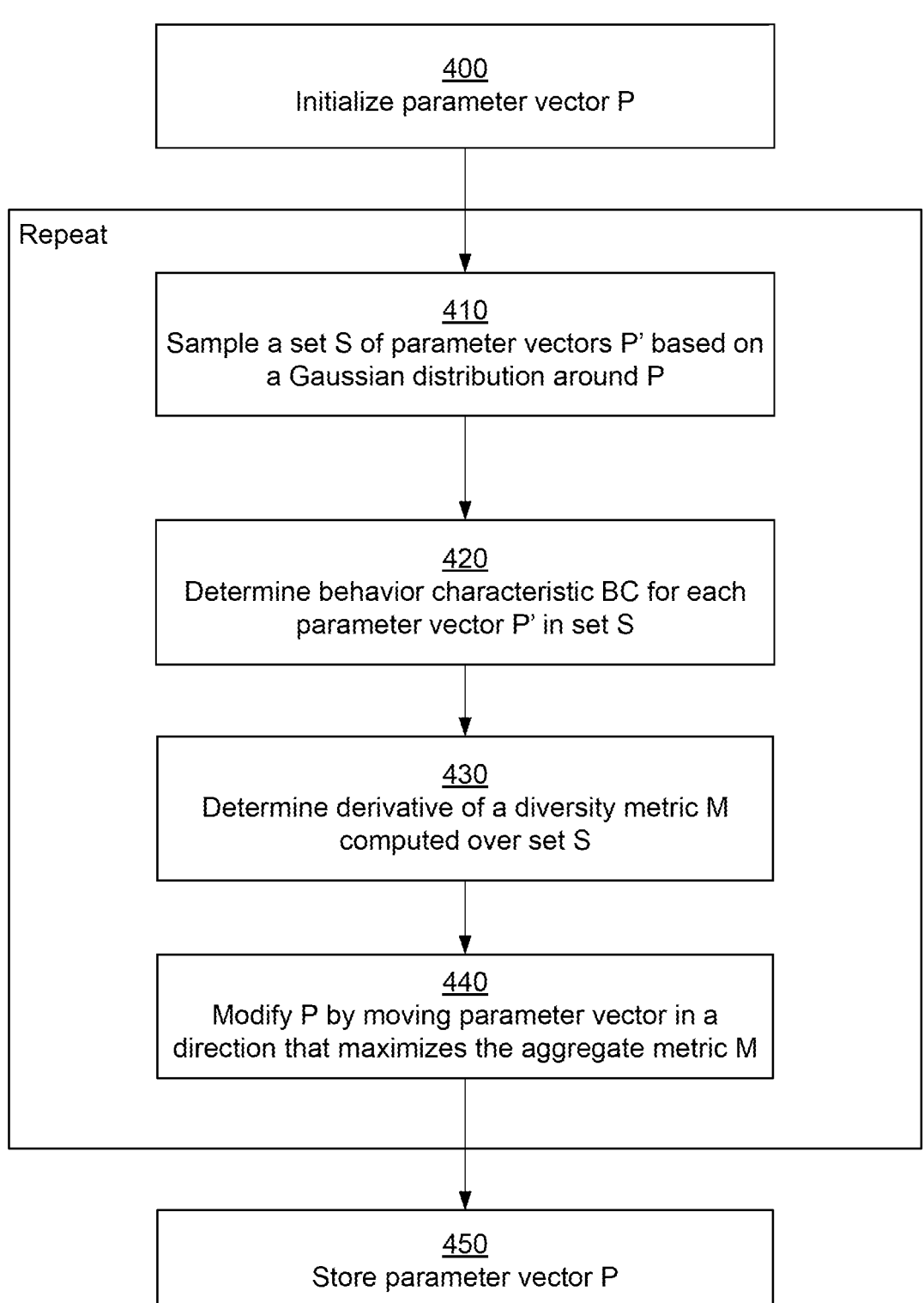
FIG. 4 is a flowchart illustrating the process of training a neural network such that the parameter vector of the neural network is adaptable to new tasks, according to one embodiment.

FIG. 4 is a flowchart illustrating the process of training 300 a neural network such that the parameter vector of the neural network is adaptable to new tasks, according to one embodiment. The steps described herein may be processed in an order different from that shown in the flowchart. Furthermore, the steps may be performed by modules other than those indicated herein.

The parameter vector initialization module 210 initializes 400 the parameter vector P, for example, using random numbers generated from a seed. The neural network training module 112 repeats the steps 410, 420, 430, and 440 multiple times.

The sampling module 230 determines 410 a set S (or a plurality) of perturbed parameter vectors P' based on a particular distribution (for example, Gaussian distribution) around the parameter vector P in the parameter vector space. The sampling module 230 obtains each perturbed parameter vector P' by perturbing the parameter vector P, for example, by either increasing or decreasing it by a random amount. In an embodiment, the sampling module 230 obtains P' by sampling from a probability distribution parameterized by its mean P.

The behavior characteristic module 220 determines 420 behavior characteristic value for each perturbed parameter vector P' from the set S. Accordingly, the behavior characteristic module 220 determines a set (or a plurality) of values of the behavior characteristic, each of the values of the behavior characteristic corresponding to a perturbed parameter vector from set S. Each behavior characteristic may be a scalar value or a vector value.

The derivative module 250 determines 430 a derivative of a diversity metric based on an aggregate of the values of the behavior characteristic. The aggregate is determined over the plurality of perturbed parameter vectors. Examples of the diversity metric include metrics represented using equation (1) or equation (3).

In an embodiment, the diversity metric module 240 generates a data structure representing a computation graph corresponding to the diversity metric and provides the following information as input to the derivative module 250: the computation graph, the plurality of perturbed parameter vectors, and the plurality of value of behavior characteristic. The derivative module 250 determines the derivative of the diversity metric based on the input received.

The parameter vector module 210 modifies 440 the parameter vector P by moving the parameter vector P in a direction in the parameter vector space that is determined to maximize the diversity metric. The direction is determined based on the derivative of the diversity metric. In an embodiment, the parameter vector module 210 uses gradient descent technique to determine the direction that maximizes the diversity metric.

The neural network training module 112 stores the final value of the parameter vector P corresponding to the trained neural network in a computer readable storage medium. The model adaptation module 260 trains 450 another neural network for performing a new task based on the parameter vector P, for example, as described in the flowchart illustrated in FIG. 3.

In some embodiments, the process illustrated in FIG. 4 is performed for a population of parameter vectors. The process may be executed in parallel, for example, each parameter vector of the population may be executed in parallel by a different processor. Alternatively, the population may be divided into a plurality of subsets and each subset processed in parallel by a distinct electronic processor.

Embodiments of the invention generate machine learning based models that can be used for various applications. For example, machine learning based models generated using embodiments of the invention are used for recognition of objects in given images/videos. An adaptable model for recognizing a category of objects can be re-trained for recognizing objects belonging to a new category. Machine learning based models generated using embodiments of the invention are used for guiding robots, for example, through an obstacle course. An adaptable model for guiding robots through a category of terrains can be re-trained for guiding the robot through a new terrain. Machine learning based models generated using embodiments of the invention are used for guiding autonomous vehicles, for example, through a city. An adaptable model for guiding robots through certain types of cities can be re-trained for self-driving through a new city that may have a new pattern of traffic or roads. Machine learning based models generated using embodiments of the invention are used for processing sequence data, for example, stream data received from sensors. An adaptable model for guiding robots through certain types of cities can be re-trained for processing stream data received from a new type of sensors previously not processed using the adaptable neural network.

Computing System Architecture

Figure 5:
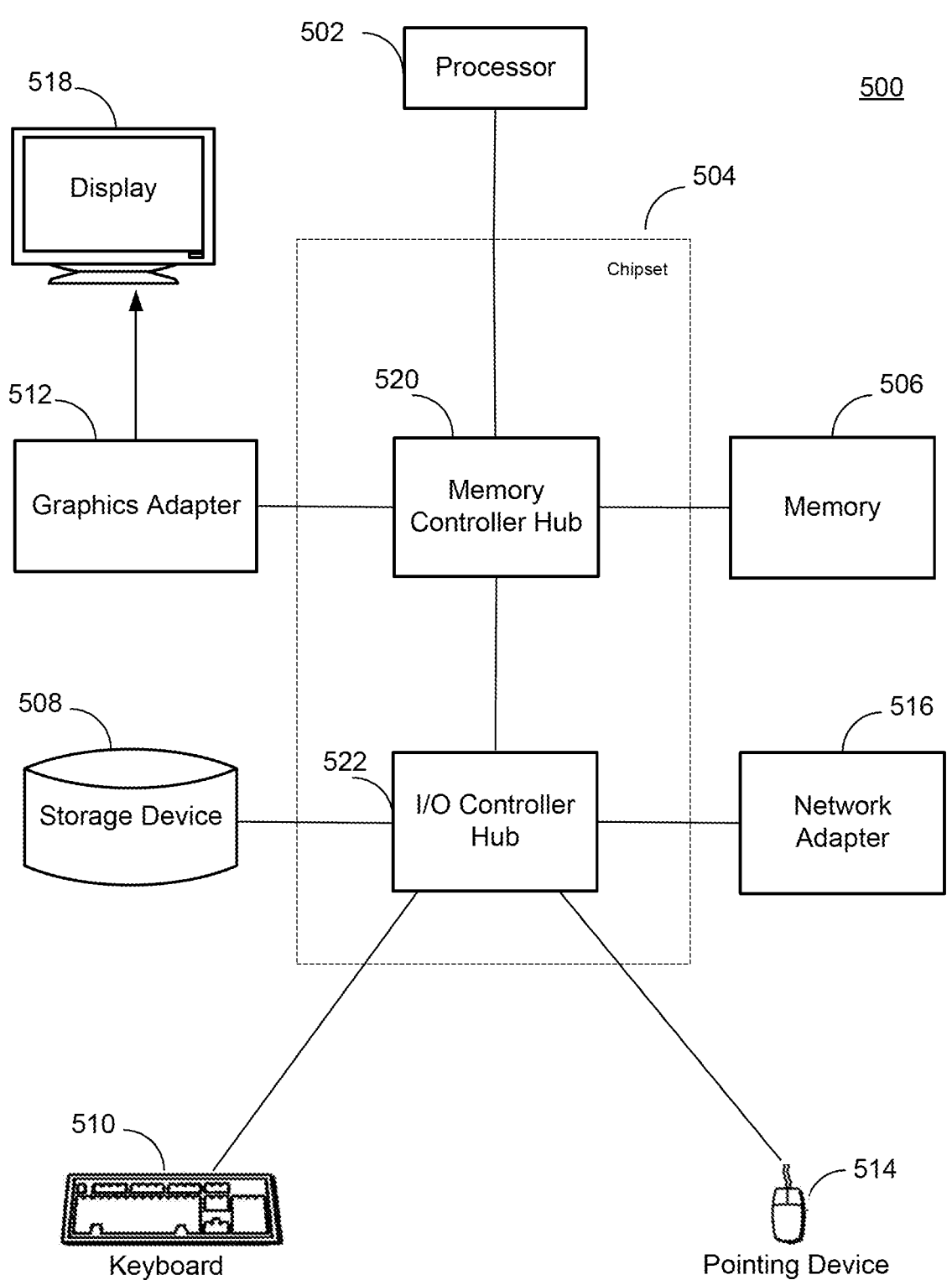
FIG. 5 is a high-level block diagram illustrating an example of a computer suitable for use in the system environment of FIG. 1, according to one embodiment.

FIG. 5 is a high-level block diagram illustrating an example computer 500 suitable for use as a client device 140, application hosting server 120, or application provider system 110. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 500 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 510, graphics adapters 512, and displays 518.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer implemented method for training a neural network, the method comprising:

initializing a parameter vector for a first neural network;

repeating steps comprising:

determining a plurality of parameter vectors within a threshold neighborhood of the parameter vector in a parameter vector space;

perturbing each parameter vector of the plurality of parameter vectors, perturbing the parameter vector comprising generating a probability distribution that has the parameter vector as a mean, and randomly sampling from the probability distribution;

for a perturbed parameter vector from the plurality of perturbed parameter vectors, determining a plurality of values of a behavior characteristic;

generating a data structure representing a computation graph corresponding to a diversity metric;

determining a derivative of the diversity metric that maximizes an entropy of the values of the behavior characteristic based on the computation graph, the plurality of perturbed parameter vectors, and the plurality of values of the behavior characteristic, the entropy determined over the plurality of perturbed parameter vectors;

determining whether the perturbed parameter vector is selected for training a second neural network based on the derivative of the diversity metric;

responsive to determining that the perturbed parameter vector is selected for training the second neural network, selecting the perturbed parameter; and responsive to the selecting of the perturbed parameter vector, modifying the parameter vector to represent a parameter vector moved in a direction in the parameter vector space, the direction determined based on the derivative of the diversity metric, the direction determined to maximize the diversity metric; and training a second neural network based on the selected modified parameter vector of the first neural network.

2. The computer implemented method of claim 1, wherein the diversity metric represents a variation of the values of behavior characteristic over a population of parameter vectors.

3. The computer implemented method of claim 1, wherein the diversity metric represents a measure of entropy of the behavior characteristic over a population of parameter vectors.

4. The computer implemented method of claim 1, wherein training the second neural network by performing the steps comprising:

receiving a new task;

initializing the second neural network to the parameter vector of the first neural network;

training the second neural network to perform the new task; and performing the new task by executing the trained second neural network.

5. The computer implemented method of claim 1, wherein the neural network is used to control movement of an object, the behavior characteristic representing a location of the object.

6. The computer implemented method of claim 1, wherein the direction determined using gradient descent.

7. The computer implemented method of claim 1, wherein each perturbed parameter vector is obtained by perturbing the parameter vector according to a probability distribution parameterized by the parameter vector, wherein the parameter vector is a mean of the probability distribution.

8. The computer implemented method of claim 1, wherein determining the plurality of values of a behavior characteristic is performed in parallel by a plurality of electronic processors.

9. A non-transitory computer-readable storage medium storing instructions that when executed by a computer processor, cause the computer processor to perform steps comprising:

initializing a parameter vector for a first neural network;

repeating steps comprising:

determining a plurality of parameter vectors within a threshold neighborhood of the parameter vector in a parameter vector space;

perturbing each parameter vector of the plurality of parameter vectors, perturbing the parameter vector comprising generating a probability distribution that has the parameter vector as a mean, and randomly sampling from the probability distribution;

determining a plurality of values of a behavior characteristic;

generating a data structure representing a computation graph corresponding to a diversity metric;

determining a derivative of the diversity metric that maximizes an entropy of the values of the behavior characteristic based on the computation graph, the plurality of perturbed parameter vectors, and the plurality of values of the behavior characteristic, the entropy determined over the plurality of perturbed parameter vectors;

determining whether the perturbed parameter vector is selected for training a second neural network based on the derivative of the diversity metric;

responsive to determining that the perturbed parameter vector is selected for training the second neural network, selecting the perturbed parameter; and responsive to the selecting of the perturbed parameter vector, modifying the parameter vector to represent a parameter vector moved in a direction in the parameter vector space, the direction determined based on the derivative of the diversity metric, the direction determined to maximize the diversity metric; and training a second neural network based on the selected modified parameter vector of the first neural network.

10. The non-transitory computer-readable storage medium of claim 9, wherein the diversity metric represents a variation of the values of behavior characteristic over a population of parameter vectors.

11. The non-transitory computer-readable storage medium of claim 9, wherein the diversity metric represents a measure of entropy of the behavior characteristic over a population of parameter vectors.

12. The non-transitory computer-readable storage medium of claim 9, wherein instructions for training the second neural network by performing the steps comprise instructions for:

receiving a new task;

initializing the second neural network to the parameter vector of the first neural network;

training the second neural network to perform the new task; and performing the new task by executing the trained second neural network.

13. The non-transitory computer-readable storage medium of claim 9, wherein the neural network is used to control movement of an object, the behavior characteristic representing a location of the object.

14. The non-transitory computer-readable storage medium of claim 9, wherein the direction determined using gradient descent.

15. The non-transitory computer-readable storage medium of claim 9, wherein each perturbed parameter vector is obtained by perturbing the parameter vector according to a probability distribution parameterized by the parameter vector, wherein the parameter vector is a mean of the probability distribution.

16. The non-transitory computer-readable storage medium of claim 9, wherein determining the plurality of values of a behavior characteristic is performed in parallel by a plurality of electronic processors.

17. A computer system comprising:

one or more processors; and a non-transitory computer readable storage medium storing instructions that when executed by the one or more processors, cause the one or more processors to performs steps comprising:

initializing a parameter vector for a first neural network;

repeating steps comprising:

determining a plurality of parameter vectors within a threshold neighborhood of the parameter vector in a parameter vector space;

perturbing each parameter vector of the plurality of parameter vectors, perturbing the parameter vector comprising generating a probability distribution that has the parameter vector as a mean, and randomly sampling from the probability distribution;

for a perturbed parameter vector from the plurality of perturbed parameter vectors, determining a plurality of values of a behavior characteristic;

generating a data structure representing a computation graph corresponding to a diversity metric;

determining a derivative of the diversity metric that maximizes an entropy of the values of the behavior characteristic based on the computation graph, the plurality of perturbed parameter vectors, and the plurality of values of the behavior characteristic, the entropy determined over the plurality of perturbed parameter vectors;

determining whether the perturbed parameter vector is selected for training a second neural network based on the derivative of the diversity metric;

responsive to determining that the perturbed parameter vector is selected for training the second neural network, selecting the perturbed parameter; and responsive to the selecting of the perturbed parameter vector, modifying the parameter vector to represent a parameter vector moved in a direction in the parameter vector space, the direction determined based on the derivative of the diversity metric, the direction determined to maximize the diversity metric; and training a second neural network based on the selected modified parameter vector of the first neural network.

18. The computer system of claim 17, wherein instructions for training the second neural network by performing the steps comprise instructions for:

receiving a new task;

initializing the second neural network to the parameter vector of the first neural network;

training the second neural network to perform the new task; and performing the new task by executing the trained second neural network.

* * * * *